United States Patent
Okada et al.

(10) Patent No.: US 7,341,676 B2
(45) Date of Patent: *Mar. 11, 2008

(54) MANUFACTURING METHOD OF SILICATE-CONTAINING PHOSPHOR AND SILICATE-CONTAINING PHOSPHOR PRECURSOR

(75) Inventors: Hisatake Okada, Tachikawa (JP); Naoko Furusawa, Hino (JP); Hideki Hoshino, Kunitachi (JP)

(73) Assignee: Konica Minolta Holdings, Inc., Tokyo (JP)

( * ) Notice: Subject to any disclaimer, the term of this patent is extended or adjusted under 35 U.S.C. 154(b) by 322 days.

This patent is subject to a terminal disclaimer.

(21) Appl. No.: 11/070,773

(22) Filed: Mar. 2, 2005

(65) Prior Publication Data
US 2005/0199858 A1 Sep. 15, 2005

(30) Foreign Application Priority Data
Mar. 10, 2004 (JP) ............... 2004-066967

(51) Int. Cl.
*C09K 11/59* (2006.01)
(52) U.S. Cl. .......... 252/301.4 R; 252/301.6 F
(58) Field of Classification Search ......... 252/301.4 F, 252/301.6 F
See application file for complete search history.

(56) References Cited

U.S. PATENT DOCUMENTS

| | | | |
|---|---|---|---|
| 5,688,438 A | * | 11/1997 | Chadha .............. 252/301.4 F |
| 7,118,687 B2 | * | 10/2006 | Ito et al. .............. 252/301.4 F |
| 2003/0232005 A1 | * | 12/2003 | Okada et al. ............. 423/659 |

FOREIGN PATENT DOCUMENTS

| | | |
|---|---|---|
| JP | 2001172621 | 6/2001 |
| JP | 2003138253 | 5/2003 |
| JP | 2004-18709 | * 1/2004 |

* cited by examiner

*Primary Examiner*—C. Melissa Koslow
(74) *Attorney, Agent, or Firm*—Lucas & Mercanti, LLP

(57) ABSTRACT

A green light emitting silicate-containing phosphor having both enhanced luminescence intensity and a shortened persistence time and a method for manufacturing the foregoing phosphor can be provided, and a phosphor precursor can also be manufactured by releasing a mixed solution from an exit of the outlet flow passage, after a suspension containing a silicon compound is supplied into the first inlet flow passage, a solution containing a metallic compound for forming a silicate-containing phosphor precursor is supplied into the second inlet flow passage, and the foregoing suspension and solution are introduced into the contact section so as to mix with each other with controlling a flow of the mixed solution so as to keep a Reynolds number of the mixed solution to be $3\times10^3$ to $1\times10^6$.

4 Claims, 1 Drawing Sheet

MANUFACTURING METHOD OF SILICATE-CONTAINING PHOSPHOR AND SILICATE-CONTAINING PHOSPHOR PRECURSOR

TECHNICAL FIELD

The present invention relates to devices such as display devices like a plasma display panel and lighting equipment like a narrow tube type fluorescent lamp and to a phosphor manufacturing technology which can be widely used for electronic apparatuses and various phosphor-using components.

BACKGROUND

A phosphor is a material in which energy of an exciting line is converted to light (an ultraviolet ray, a visible light, or an infrared ray) by exposing the phosphor to a ray such as an ultraviolet ray, a visible light, an infrared ray, a heat ray, an electron beam, an X-ray, or a radiation. The foregoing phosphor-using devices include a fluorescent lamp, an electron tube, a cold cathode display, a fluorescent display tube, a plasma display panel (PDP), an electroluminescence panel, a scintillation detector, an X-ray image intensifier, thermal photoluminescence dosimeter, and an imaging plate (Refer to "Phosphor Handbook" edited by Keikoutai Dougakkai and published by Ohmsha, Ltd.). Those are the devices in which electrical energy is converted to energy of the foregoing exciting line, and this energy is converted further to the foregoing light. Electronic apparatuses which combine such a device with an electronic circuit or a device component such as a light fixture, a computer, a keyboard, or an electronic apparatus without using a phosphor are widely utilized for a display device, lighting equipment and so forth. There are also provided phosphor-using components which combine a phosphor in the form of powder with material except a phosphor such as liquid of water or organic solvent, resin, plastic, and metal or ceramic. Those are widely used, for example, for phosphor coating material in the form of liquid or paste, solids like an ashtray, a direction board, a guide plate, a seal, a stationery product, an outdoor product, and a safety sign plate.

In recent years, PDP has been a focus of constant attention as a flat panel display which can replace a cathode ray tube (CRT) because a large and flat screen is especially possible in PDP. PDP is a display element composed of a number of very small discharge spaces (hereinafter, may be referred to as "display cells") which are placed in the form of matrix, a discharge electrode is placed within each of display cells, and a phosphor is coated on the inner wall of a display cell. Since an inert gas such as He—Xe, Ne—Xe, or Ar are filled in a space of each of display cells, discharge with the inert gas is generated within each of display cells by applying a voltage to a discharge electrode, and a vacuum ultraviolet ray is radiated. A phosphor is excited by this vacuum ultraviolet ray to emit a visible light. An image is displayed in a display element by luminescence of a phosphor in a display cell at the position where a signal enters. Phosphors, which are used for each of display cells, corresponding to luminescence of blue, green and red respectively are used and a full color can be displayed by being color-coded with those colors in the form of matrix.

Phosphors used mainly for PDP presently are (Y, Gd)$BO_3$: Eu phosphor for a red light emitting phosphor, $Zn_2SiO_4$: Mn phosphor for a green light emitting phosphor and $BaMgAl_{10}O_{17}$:Eu phosphor for a blue light emitting phosphor. It is important that luminescence of the green light emitting phosphor having high visibility especially among those phosphors is intensified in order to enhance white light luminance. In this situation, it is strongly required that luminescence generated by excitation of a vacuum ultraviolet ray of the green light emitting phosphor is further intensified.

It is seen further as a problem that a persistence time is long in Mn-containing phosphors such as $Zn_2SiO_4$: Mn and so forth. In such a situation, luminance drops with increase of Mn concentration though it is known that the persistence time becomes short with increase of Mn content. In this manner, luminance and persistence time are presently in a trade-off relation.

Thus, there still remains a critical issue in which the drop in luminance of the foregoing silicate-containing phosphor needs to be suppressed and the persistence time needs to be shortened at the same time.

Usually, a manufacturing method in which a phosphor can be obtained by an inter-solid reaction, using a solid-phase technique after mixing both a given amount of compound containing an activating element and a given amount of compound containing elements comprising a phosphor base and burning them at a given temperature has widely been used as a commonly available manufacturing method of the foregoing phosphor (Refer to "Phosphor Handbook").

However, it is difficult to manufacture a phosphor having a purely stoichiometric composition by the solid-phase technique and excessive impurities obtained by no reaction or by-product salts produced by reaction may often remain through an inter-solid reaction, so that it becomes difficult to obtain a stoichiometrically high-purity phosphor. As a result, it is pointed out that there appear problems such as a luminance drop of a phosphor and so forth.

On the one hand, it is known that a liquid phase technique is better suited than a solid phase technique for obtaining high-purity phosphor particles having an even composition. It is known that those are oxidized through processes of collection, rinsing, drying and burning by using the following methods such as a reaction crystallization technique, a sol-gel processing, a coprecipitation technique, a hydrothermal synthesis and so forth as commonly available liquid phase techniques for the phosphor manufacturing.

It is also disclosed in Patent Document 1 that there is a method by which a precursor is formed by precipitating salt of organic acid obtained with other elements on the surface of a compound containing a few elements of which a phosphor is composed. But, this method is related to an aluminate phosphor, using an aluminum compound, and information concerning manufacturing of a silicate-containing phosphor for a green light emitting phosphor can not be obtained in Patent Document 1.

Similarly, information concerning manufacturing of a silicate-containing phosphor can not be obtained also in Patent Document 2 and information described in Patent Document 2 is still insufficient from the aspect of reaction since "Reynolds number" is not defined at the time of reaction though a preparation method of a phosphor precursor formed by a reaction tube is disclosed in Patent Document 2. Further, a problem concerning wear performance inside the reaction tube is not also taken into consideration.

(Patent Document 1) Japanese Patent O.P.I. Publication No. 2001-172621

(Patent Document 2) Japanese Patent O.P.I. Publication No. 2003-138253

SUMMARY

An object of the present invention is to provide a phosphor manufacturing method and the phosphor having both strong luminescence intensity and a shortened persistence time which can not be achieved by a conventional method, and the foregoing phosphor-using devices, electronic apparatuses and components.

DESCRIPTION OF THE PREFERRED EMBODIMENTS

Figure 1:
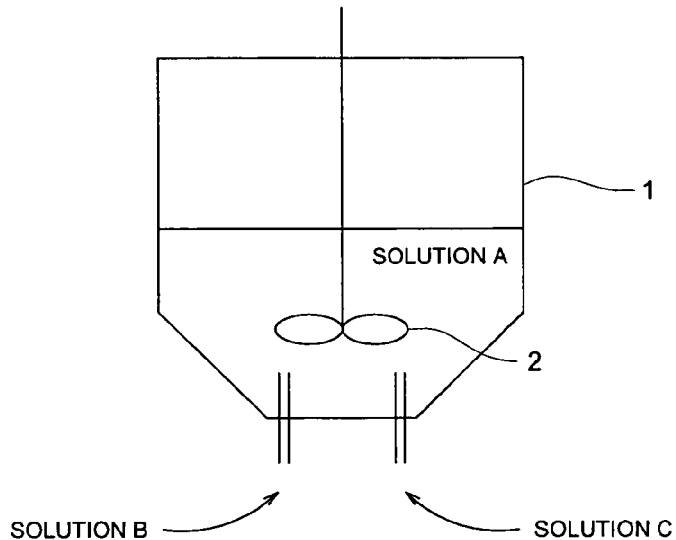
FIG. 1 is a schematic diagram showing a reaction apparatus used for the comparative example.

The foregoing object of the invention can be accomplished by the following structures.

(Structure 1) A method for manufacturing a silicate-containing phosphor precursor by using a mixing device having:

(a) at least one first inlet flow passage;
(b) at least one second inlet flow passage, the first and second inlet flow passages connecting together so as to form a contact section; and
(c) an outlet flow passage which is connected with the contact section, the method having the steps of:

(i) supplying a suspension containing a silicon compound into the first inlet flow passage with the first solution transporting means and a solution containing a metallic compound for forming a silicate-containing phosphor precursor into the second inlet flow passage with the second solution transporting means;
(ii) introducing the suspension and the solution into the contact section so as to mix with each other and to form a silicate-containing phosphor precursor; and
(iii) releasing the silicate-containing phosphor precursor from an exit of the outlet flow passage with controlling a flow of the silicate-containing phosphor precursor so as to keep a Reynolds number of the silicate-containing phosphor precursor to be $3\times10^3$ to $1\times10^6$.

(Structure 2) A silicate-containing phosphor precursor manufactured by using a mixing device having:

(a) at least one first inlet flow passage;
(b) at least one second inlet flow passage, the first and second inlet flow passages connecting together so as to form a contact section; and
(c) an outlet flow passage which is connected with the contact section, the method having the steps of:

(i) supplying a suspension containing a silicon compound into the first inlet flow passage with the first solution transporting means and a solution containing a metallic compound for forming a silicate-containing phosphor precursor into the second inlet flow passage with the second solution transporting means;
(ii) introducing the suspension and the solution into the contact section so as to mix with each other and to form a silicate-containing phosphor precursor; and
(iii) releasing the silicate-containing phosphor precursor from an exit of the outlet flow passage with controlling a flow of the silicate-containing phosphor precursor so as to keep a Reynolds number of the silicate-containing phosphor precursor to be $3\times10^3$ to $1\times10^6$.

(Structure 3) The method for manufacturing a silicate-containing phosphor precursor of Structure 1, wherein at least the outlet flow passage is composed of material having less wear performance to the suspension, the solution and the mixed solution.

(Structure 4) A method for manufacturing a silicate-containing phosphor having the step of:

burning the silicate-containing phosphor precursor of Structure 1 obtained after removal of a liquid that is released from the exit of the outlet flow passage.

(Structure 5) A silicate-containing phosphor manufactured by the method of Structure 4.

(Structure 6) The silicate-containing phosphor of Structure 5, wherein a mean particle diameter is not more than 1 μm and a coefficient of variation of particle diameter distribution is not more that 50%.

(Structure 7) The silicate-containing phosphor of Structure 5, wherein a total content of sodium and iron is not more than 100 ppm.

(Structure 8) The silicate-containing phosphor of Claim 6, wherein a total content of sodium and iron is not more than 100 ppm.

DETAILED DESCRIPTION OF INVENTION

It is found by the inventors in intensive examinations of various problems described above that a method for manufacturing a phosphor having enhanced luminescence intensity whose persistence time is shortened, such a phosphor and the foregoing phosphor-using devices, and electronic apparatuses and phosphor-using components, which can not be obtained by a-conventional method, can be provided by using the method for mixing a suspension containing a silicon compound with a solution containing a metallic compound for possibly forming a silicate-containing phosphor through a burning process, and by using the method for forming a precursor and then burning it, as described in Structure 1.

Preferable examples of a crystal matrix as a silicate-containing phosphor concerning the present invention include $Y_2SiO_5$, $Zn_2SiO_4$, and so forth.

A crystal matrix and an activator or a co-activator are not specifically limited with respect to the element compositions, and those in which a part of elements is substituted by a homologue element can also be utilized. Examples of silicate-containing phosphor compounds concerning the present invention are shown below. The present invention, however, is not limited to those compounds.

[Blue Light Emitting Inorganic Phosphor Compound]
$Y_2SiO_5:Ce^{3+}$

[Green Light Emitting Inorganic Phosphor]
$(Ba, Mg)_2SiO_4:Eu^{2+}$
$Y_2SiO_5:Ce^{3+}, Tb^{3+}$
$Sr_2Si_3O_8-2SrCl_2:Eu^{2+}$
$Zr_2SiO_4, MgAl_{11}O_{19}:Ce^{3+}, Tb^{3+}$
$Ba_2SiO_4:Eu^{2+}$
$Zn_2SiO_4:Mn^{2+}$
$Y_2SiO_5:Ce^{3+}, Tb^{3+}$

[Red Light Emitting Inorganic Phosphor]
$(Ba, Mg)_2SiO_4:Eu^{3+}$
$Ca_2Y_8(SiO_4)_6O_2: Eu^{3+}$
$LiY_9(SiO_4)_6O_2:Eu^{3+}$ In the present invention, a silicon compound is used. A silicon compound described here which means a solid containing silicon can be any solid if it is substantially insoluble in solution which is used. For example, silica (silicon dioxide) and so forth are given and it is preferable that silica is used among those. Gas phase process silica, wet process silica, or colloidal silica is given as silica.

BET specific surface area of a silicon compound in the present invention is preferably 50 $m^2/g$ or more, more preferably 100 $m^2/g$ or more and still more preferably 200 $m^2/g$ or more.

A primary particle diameter or a secondary coagulation particle diameter of a silicon compound in the present invention is preferably 1 μm or less, more preferably 0.5 μm or less and still more preferably 0.1 μm or less.

A metallic element contained in a metallic compound in the present invention can be any metallic element if a silicate-containing phosphor can be composed of it through a burning process, and it is preferable that the metallic element is at least one metallic element selected from the group including Zn, Mn, Mg, Ca, Sr, Ba, Y, Zr, Al, Ga, La, Ce, Eu and Tb. In the case of manufacturing a green light emitting phosphor ($Zn_2SiO_4$:Mn and so forth), for example, a phosphor containing Zn or Mn may be employed. The foregoing metallic element may be either a solid which is substantially insoluble in solution used or one which is composed of chloride or nitrate and is soluble in solution used.

It is preferable that at least one metallic element selected from the group including Zn, Mn, Mg, Ca, Sr, Ba, Y, Zr, Al, Ga, La, Ce, Eu and Tb is precipitated around a silicon compound. Additionally, it is more preferable that organic acid salt or hydroxide obtained by reaction with a precipitant such as organic acid or alkali hydroxide is precipitated around a silicon compound. It is preferable that as organic acid or alkali hydroxide, which are used, the metallic element except silicon is preferably contained one time or more of stoichiometric quantity required to be precipitated as organic acid salt or hydroxide.

A solution comprising a suspension containing a silicon compound in the present invention can be any solution if a silicon compound is substantially insoluble as described above, and water, alcohol, or a mixture of those is preferable. Alcohol can be any alcohol if it disperses a silicon compound, and examples of the alcohol include methanol, ethanol, isopropanol, propanol, butanol and so forth. Ethanol which comparatively disperses a silicon compound easily is preferable among those.

A method for mixing a suspension containing a silicon compound with a solution containing a metallic compound for possibly forming a silicate-containing phosphor by a burning process in the present invention can be any method, and an agitation mixing method, for example, is preferable since it can be easily controlled and it is at a low cost. Any technique such as a batch type, a continuous type, or an external circulation mixing type can be used as a mixing technique. There is provided, for example, a method in which a base solution which is a solution containing a silicon compound is agitated, and a solution containing another element is added into the base solution or a method in which the base solution is externally circulated, and another solution is added into a mixer placed in the middle of an external circulation path, both of which are preferable from the aspect of dispersing a silicon compound. A mixing technique in the case of adding a precipitant can also be any technique, not depending on any sequence in a mixing process. There is provided, for example, a method in which the base solution which is a solution containing a silicon compound is agitated, and another solution is added into the base solution at the same time by a double jet technique or a method in which the base solution is externally circulated, and another solution is added into a mixer placed in the middle of an external circulation path at the same time by the double jet technique. Those methods are preferable. Though a position for adding the solution may also be on the surface of the base solution or in the base solution, the position in the base solution is preferable from the aspect of mixing evenly. Additionally, it is preferable from the aspect of mixing evenly that a Reynolds number of agitation is $1\times10^3$ or more, preferably $3\times10^3$ or more and more preferably $5\times10^3$ or more.

In the case of the Reynolds number less than $1\times10^3$, a mixing condition becomes worse, and evenness of phosphor particles drops.

According to a method for mixing a solution containing a silicon compound with a solution containing a metallic compound for possibly forming a silicate-containing phosphor through a burning process in the present invention, after a suspension containing silica introduced from the first inlet flow passage and a raw material solution introduced from the second inlet flow passage are continuously introduced into the contact section so as to mix with each other, they are continuously introduced into the outlet flow passage. It is preferable that a manufacturing apparatus designed to continuously release the mixed solution is used after the mixed solution introduced from the contact section is released so as to keep a Reynolds number to be $3\times10^3$ to $1\times10^6$ for $1\times10^{-3}$ to $3.6\times10^3$ seconds. The lower limit of a Reynolds number after the contact is more preferably $5\times10^3$ and still more preferably $1\times10^4$. The lower limit of the foregoing time for releasing the solution is preferably $1\times10^{-3}$ seconds, more preferably $1\times10^{-2}$ seconds and still more preferably $1\times10^{-1}$ seconds. When D is a representative length of an object in the flow, U is a velocity, ρ is a density, and η is a viscosity coefficient, "Reynolds number" means a dimensionless number obtained by the following formula.

$Re=\rho DU/\eta$

When the time for releasing the solution is shorter than $1\times10^{-3}$ seconds, and the solution is not sufficiently mixed, evenness of phosphor particles drops.

It is preferable that a suspension containing a silicon compound in the present invention has been adjusted in advance. The foregoing adjustment described in the present invention means that a desired condition is obtained by adjusting in advance a particle diameter and dispersion condition in the suspension containing a silicon compound. It may be possible as an example of the adjusting method to combine the number of agitation rotations with time to the suspension containing a silicon compound, and it is preferable that the suspension containing a silicon compound is dispersed by ultrasonic waves as a more effective way. At the time, a surface active agent or a dispersing agent may be added as needed. It is preferable to conduct the solution temperature adjustment preferably at not more than 50° C., more preferably at not more than 30° C. and still more preferably at not more than 10° C. to prevent the increase in viscosity because of recoagulation of a silicon compound. In order to obtain very fine phosphors, it is preferable to adjust the coagulation particle diameter to be not more than 1 µm, preferably not more than 0.5 µm and more preferably not more than 0.1 µm.

Colloidal silica for which a particle diameter and dispersion condition in the suspension are adjusted to be prepared in advance may also be used in the present invention. Anionic colloidal silica is preferred, and its particle diameter is preferably not more than 1 µm, preferably not more than 0.5 µm and more preferably not more than 0.1 µm in order to obtain very fine phosphors.

According to a method in the present invention, for making the mixed solution produced from a solution containing a silicon compound and a solution containing a metallic compound for possibly forming a silicate-containing phosphor through a burning process to be a precursor for burning, it is preferable that a direct drying process is conducted, or solids are dried after insoluble salts are removed by existing methods, for example, filteration washing, film separation and so forth, as needed, and then, the solid is separated from the liquid by a method such as filteration or centrifugal separation. The drying temperature is preferably in the range between 20 and 300° C. and more preferably in the range between 90 and 200° C. Evaporation or spray drying which is a drying process in granulation is provided as a process for direct drying.

Next, a method for burning a silicate-containing phosphor precursor can be any method, and a desired phosphor can be obtained, for example, by filling the precursor into an alumina boat and then burning it at a given temperature in a predetermined gas atmosphere. In the case of burning the precursor of a green light emitting phosphor ($Zn_2SiO_4$:Mn and so forth), for example, it is preferable to burn it one time or more in an inert atmosphere, in the temperature range between 400 and 1400° C. and in the range between 0.5 and 40 hours. Further, the atmospheric air (or oxygen atmosphere) and the reducing atmosphere may be arranged to be used as needed. In the case of using the reducing atmosphere, it is preferable to burn it at not more than 800° C. in order to cut down on evaporation of zinc from the inside of crystals. A method by which a mass of graphite is added into the inside of a boat which is filled with the precursor or a method for burning in a nitrogen-hydrogen atmosphere or an inert gas-hydrogen atmosphere is provided as a method for obtaining the reducing atmosphere. Steam may be included in those atmospheres. A process of dispersing, washing, drying, or sieving may be conducted for a silicate-containing phosphor obtained after a burning process.

In the present invention, the precursor prepared is filtered by a centrifugal separator and dried. The precursor is subsequently burned under the predetermined atmosphere, and a phosphor is prepared. In this case, it is preferred to burn the precursor under the oxidization atmosphere at a temperature from 1000 to 1400° C. (for example, nitrogen–21% of oxygen by weight). Eu concentration of the particle surface can be controlled to a desired concentration adequately by changing a burning atmosphere, time, temperature, a number of times of burning and so forth. It is also preferable that a burning process is conducted under an inert atmosphere at a low temperature from 800 to 1000° C. after a burning process conducted under the oxidization atmosphere at a high temperature from 1200 to 1400° C. (for example, nitrogen–21% of oxygen by weight). After the phosphor obtained in the burning process is also rinsed with acid, it is preferably dried. Emission luminance is improved possibly by changing a condition of the particle surface through an acid rinsing process, or by dissolving impurities penetrated in the burning process. Though the acid used herein is not specifically limited to an acid type, examples of acid provided include a mineral acid such as a hydrochloric acid, a nitric acid, or a sulfuric acid and a carboxylic acid such as a formic acid, an acetic acid, a butyric acid, a palmitic acid, a stearic acid, an acrylic acid, a methacrylic acid, an oleic acid, a linoleic acid, a linolenic acid, an oxalic acid, an adipic acid, a maleic acid, a fumaric acid, a lactic acid, a malic acid, a tartaric acid, a benzoic acid, a salicylic acid, a phthalic acid, a propionic acid, an isobutyric acid, a valeric acid, a pivalic acid, a lauric acid, a myristic acid, a propiolic acid, or a crotonic acid. Though the acid concentration, rinsing time and temperature are dependent upon the method for manufacturing a phosphor, it is preferred to be processed at 0.01 to 1 N (normality) at a temperature from 20 to 30° C., rinsing after agitating for 5 to 60 min.

It is preferable in the present invention that a precipitant is used as needed, and the precipitant used at that time is organic acid or alkali hydroxide. Organic acid having —COOH group is preferable as organic acid, and examples of the organic acid include oxalic acid, formic acid, acetic acid and dihydroxysuccinic acid. Especially in the case of using oxalic acid, it is more preferable that the acid reacts readily with a cation of Zn, Mn, Mg, Ca, Sr, Ba, Y, Zr, Al, Ga, La, Ce, Eu, or Tb, and an oxalate is easily precipitated by a cation of Zn, Mn, Mg, Ca, Sr, Ba, Y, Zr, Al, Ga, La, Ce, Eu, or Tb. A dimethyl oxalate which produces oxalic acid through a hydrolysis and so forth, for example, may be used as a precipitant.

Alkali hydroxide in the present invention can be any alkali hydroxide if it is alkali hydroxide having —OH group or alkali hydroxide producing —OH group through reaction with water or through a hydrolysis. Ammonia, sodium hydroxide, potassium hydroxide, urea and so forth, for example, are given and ammonia which contains no alkali metal is preferable.

It is preferable that a phosphor is used for devices such as a fluorescent lamp, a fluorescent display tube, a plasma display panel (PDP) and so forth or for phosphor-using components such as phosphor coating material, an ashtray, a direction board, a guide plate, a seal, a stationery product, an outdoor product, a safety sign plate and so forth.

When the precipitate is synthesized by the foregoing reaction apparatus, it is common that the apparatus is composed of stainless steel pipes. In the case of using stainless steel piping, however, a phenomenon of a decline in luminescence efficiency has often occurred.

It is found in an intensive examination that there is a problem that stainless steel powder is mixed into a precursor since a vessel and agitation blades are worn down during agitating because of high hardness of the phosphor precursor. It is also found in this case that Na, Fe, Cr, Ni, Mo, Ti, Nb and so forth mixed into the inside of phosphor crystals adversely affect the phosphor performance when the precursor into which stainless steel powder is mixed is burned. For this reason, it is preferable that the inside of the stainless steel pipe is coated by Teflon (R), and it is more preferable that the pipe itself is composed of resin such as polypropylene and so forth.

A mean particle diameter of a phosphor is preferably not more than 1 µm, more preferably not more than 0.8 µm and still more preferably not more than 0.5 µm.

A coefficient of variation of particle diameter distribution is expressed as a standard deviation of particle size divided by a mean particle diameter. A coefficient of variation of phosphor particle diameter distribution is preferably not more than 50%, more preferably not more than 30% and still more preferably not more than 15%.

EXAMPLE

(1) Manufacturing Phosphor S1 (Refer to FIG. 1)

Pure water of 2000 ml was placed as solution A, and the solution, which was adjusted to be 500 ml in liquid quantity in total by mixing 219 g of ammonia water (28%) and colloidal silica containing silicon dioxide of 45 g with pure water added, was placed as solution B. The solution, which was adjusted to be 500 ml in liquid quantity in total by mixing zinc nitrate hexahydrate (99.0% in purity, manufactured by Kanto Corporation) of 424 g and manganese nitrate hexahydrate (98.0% in purity, manufactured by Kanto Corporation) of 21.5 g with pure water added, was also placed as solution C. After solution A was introduced into a stainless steel reaction vessel 1 as shown in FIG. 1, it was agitated at 900 rpm by using agitation blades 2 of 5 cm in diameter, maintaining temperature at 40° C., and a Reynolds number was set to 0.0375. In this situation, solution B and solution C, similarly maintaining temperature at 40° C., were added at 60 ml/min in constant speed onto the liquid surface of the vessel into which solution A was introduced. The precipitate obtained by reaction was filtered under pressure, and the solid-liquid separation was conducted. Next, after a drying process took place at 100° C. for 12 hours, a dried precursor was obtained. Next, after the precursor was burned at 1200° C. in a nitrogen 100% atmosphere for 3 hours, phosphor S1 as a comparative example was obtained.

In addition, a Reynolds number (Re) to be controlled is dependent upon a flow rate and a diameter of the flow passage tube after mixing. The diameter of the flow passage tube is preferably 0.1 to 15 mm, more preferably 0.5 to 10 mm. The flow rate is preferably 0.5 to 30 L/min. The concentration of a mixed solution is preferably 0.005 to 5.0 mol/L, and more preferably 0.1 to 1.0 mol/L.

Figure 2:
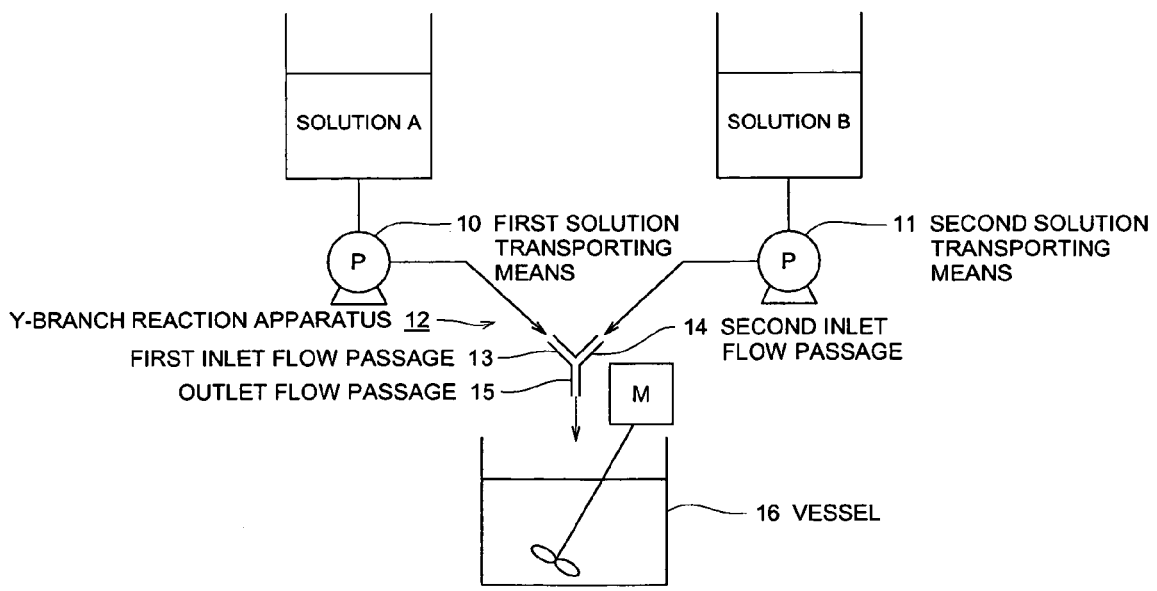
FIG. 2 is a schematic diagram showing a reaction apparatus used for the example in the present invention.

(2) Manufacturing Phosphor S2 (Refer to FIG. 2)

The solution, which was adjusted to be 1500 ml in liquid quantity in total by mixing 219 g of ammonia water (28-%) and colloidal silica containing silicon dioxide of 45 g with pure water added, was placed as solution A. The solution, which was adjusted to be 1500 ml in liquid quantity in total by mixing zinc nitrate hexahydrate (99.0% in purity, manufactured by Kanto Corporation) of 424 g and manganese nitrate hexahydrate (98.0% in purity, manufactured by Kanto Corporation) of 21.5 g with pure water added, was also placed as solution B.

After keeping warm solution A and solution B at 40° C., they were added into stainless steel Y-branch reaction apparatus 12 at 1800 ml/min in speed by using roller pump 10 as the first solution transporting means and roller pump 11 as the second solution transporting means. As shown in FIG. 2, Y-branch reaction apparatus 12 possesses the first inlet flow passage 13 into which solution A is introduced, the second inlet flow passage 14 into which solution B is introduced and outlet flow passage 15 in which solution A and solution B are introduced into the contact section and mixed with each other, and a flow of the mixed solution is formed. The precipitate obtained by reaction of the liquid in the mixed solution which was released from an exit of the outlet flow passage and collected in vessel 16 was filtered under pressure, and the solid-liquid separation was conducted. Next, after a drying process took place at 100° C. for 12 hours, a dried precursor was obtained. Next, after the precursor which was obtained was burned at 1200° C. in a nitrogen 100% atmosphere for 3 hours, phosphor S2 concerning the present invention was obtained.

In addition, the diameter of the flow passage tube is 1 mm, and Re is 38274 in this case.

(3) Manufacturing Phosphor S3 (Refer to FIG. 2)

The solution, which was adjusted to be 1500 ml in liquid quantity in total by mixing 219 g of ammonia water (28%) and colloidal silica containing silicon dioxide of 45 g with pure water added, was placed as solution A. The solution, which was adjusted to be 1500 ml in liquid quantity in total by mixing zinc nitrate hexahydrate (99.0% in purity, manufactured by Kanto Corporation) of 424 g and manganese nitrate hexahydrate (0.98.0% in purity, manufactured by Kanto Corporation) of 21.5 g with pure water added, was also placed as solution B.

After keeping warm solution A and solution B at 40° C., they were added into Y-branch reaction apparatus 12 in which Teflon (R) was coated on stainless steel at 1800 ml/min in speed by using roller pump 10 and roller pump 11. After diluting the precipitate obtained by reaction with pure water, the precipitate was filtered under pressure, and the solid-liquid separation was conducted. Next, after a drying process took place at 100° C. for 12 hours, a dried precursor was obtained. Next, after the precursor which was obtained was burned at 1200° C. in a nitrogen 100% atmosphere for 3 hours, phosphor S3 concerning the present invention was obtained.

Evaluation

The composition, luminescence intensity and persistence time of phosphors S1-S3 obtained in the above (1)-(3) were analyzed.

1. Evaluation of Luminescence Intensity

By exposing phosphors S1-S3 to an ultraviolet ray respectively with an excimer 146 nm lamp (manufactured by Ushio Inc.) in the inside of a vacuum chamber of 0.1 to 1.5 Pa, green light was emitted from the phosphor. Next, intensity of the green light thus obtained was measured, using a detector MCPD-3000 (manufactured by Otsuka Electronics Co., Ltd.). A peak intensity in luminescence is obtained in a relative figure wherein phosphor S1 is set to 100. Results obtained with the mean particle diameter of phosphors are shown in Table 1.

TABLE 1

| Phosphor | Mean particle diameter [μm] | Coefficient of variation of particle diameter distribution [%] | Relative luminescence intensity [%] | Persistence time [msec] | Total content of Na•Fe [ppm] | Remark |
| --- | --- | --- | --- | --- | --- | --- |
| S1 | 1.3 | 65 | 100 | 8.1 | 130 | comparative example |

TABLE 1-continued

| Phosphor | Mean particle diameter [μm] | Coefficient of variation of particle diameter distribution [%] | Relative luminescence intensity [%] | Persistence time [msec] | Total content of Na•Fe [ppm] | Remark |
|---|---|---|---|---|---|---|
| S2 | 0.8 | 46 | 113 | 7.8 | 132 | the present invention |
| S3 | 0.8 | 44 | 121 | 7.9 | 87 | the present invention |

2. Composition Analysis

In order to determine the composition of a phosphor, silicon was quantitatively determined by the alkali fusion method, and elements other than silicon were quantitatively determined by inductively coupled plasma-atomic emission spectroscopy analysis after dissolving the phosphor with fluorinated acid.

In reference to the alkali fusion method, after each phosphor of 0.1 g was weighed, and sodium carbonate (superhigh grade, manufactured by Wako Pure Chemical Industries, Ltd.) of 2.5 g was added into a platinum crucible and was dissolved at 1000° C. in one hour by an electric furnace, ultra pure water was subsequently added, and what is obtained was dissolved by heating. In the case of an insoluble material which remained, the volume was set to 50 ml after filtering properly. A silicon standard stock solution which was manufactured by Kanto Corporation (for atomic absorption spectrochemical analysis) was added into the solution in which sodium carbonate of 2.5 g was only dissolved was separately adjusted to be prepared, and a standard concentration solution was also adjusted to be prepared.

In reference to dissolution by using fluorinated acid, after each phosphor of 0.1 g which was weighed, and hydrofluoric acid (ultrahigh purity, manufactured by Kanto Corporation) of 10 ml was added into a Teflon (R) beaker, and a drying process was conducted by heating. After repeating this twice, nitric acid (ultrahigh purity, manufactured by Kanto Corporation) of 10 ml was added, what is obtained was dissolved, and the volume was set to 50 ml. The solution obtained here was used as a sample analyzed.

Inductively coupled plasma-atomic emission spectrometer SPS4000 (manufactured by Seiko Instruments Inc.) or inductively coupled plasma-mass spectrometer QP-Ω (manufactured by VG Elemental) was used for both qualitative or quantitative analysis of elements. In the case of quantitative analysis, a standard concentration solution into which a standard stock solution and nitric acid (ultrahigh purity, manufactured by Kanto Corporation) were added was adjusted to be prepared, and the quantitative analysis was conducted by a calibration curve method.

The impurity content except phosphor composition is shown in Table 1. Results in which the phosphor in the present invention has both enhanced luminescence intensity and a shortened persistence time were obtained as shown in Table 1.

Effect of the Invention

It becomes possible to enhance luminescence intensity of a green light emitting phosphor possessing high visibility because phosphors having enhanced luminescence intensity can be obtained by using the invention according to any one of Structures 1-7, so that it becomes possible to enhance white light luminance of a full color PDP.

A decline in luminescence intensity caused by impurities such as sodium, iron and so forth is prevented by using the invention according to Structure 3 because it is prevented that those impurities leak out of reaction vessels owing to wear, so that it has become possible to manufacture a phosphor having enhanced luminescence intensity.

A phosphor in even particle diameter with uniform quality is manufactured by using the invention according to Structure 6.

A phosphor having enhanced luminescence intensity which contains the least impurities by which luminescent intensity drops is manufactured by using the invention according to Structure 7.

What is claimed is:

1. A method for manufacturing a silicate-containing phosphor precursor comprising the steps of:
    (a) supplying a suspension containing a colloidal silica into a first inlet flow passage with a first solution transporting means;
    (b) supplying a solution containing a metallic compound for forming a silicate-containing phosphor precursor into a second inlet flow passage with a second solution transporting means;
    (c) introducing the suspension and the solution into a contact section where said first and said second inlet flow passages meet so as to mix said suspension and said solution with each other and to form a silicate-containing phosphor precursor; and
    (d) releasing the silicate-containing phosphor precursor from an exit of an outlet flow passage connected to the contact section while controlling a flow of the silicate-containing phosphor precursor so as to keep a Reynolds number of the silicate-containing phosphor precursor to be $3 \times 10^3$ to $1 \times 10^6$.

2. The method for manufacturing the silicate-containing phosphor precursor of claim 1, wherein at least the outlet flow passage is composed of material having less wear performance to the suspension, the solution and the mixed suspension and solution.

3. A method for manufacturing a silicate-containing phosphor comprising the step of:
    burning the silicate-containing phosphor precursor of claim 1 obtained after removal of a liquid that is released from the exit of the outlet flow passage.

4. A silicate-containing phosphor manufactured by the method of claim 3,
    wherein a total content of sodium and iron is not more than 100 ppm, and wherein a mean particle diameter is not more than 1 μm and a coefficient of variation of particle diameter distribution is not more than 50%.

* * * * *